United States Patent
Hemmings

(10) Patent No.: US 12,157,858 B2
(45) Date of Patent: Dec. 3, 2024

(54) PROCESS FOR PRODUCTION OF USEFUL HYDROCARBON MATERIALS FROM PLASTIC WASTE

(71) Applicant: Resonante LLC, Houston, TX (US)

(72) Inventor: John William Hemmings, Fripp island, SC (US)

(73) Assignee: Resonante LLC, Houston, TX (US)

( * ) Notice: Subject to any disclaimer, the term of this patent is extended or adjusted under 35 U.S.C. 154(b) by 351 days.

(21) Appl. No.: 17/818,810

(22) Filed: Aug. 10, 2022

(65) Prior Publication Data

US 2022/0389328 A1     Dec. 8, 2022

Related U.S. Application Data

(63) Continuation-in-part of application No. 17/002,445, filed on Aug. 25, 2020, now abandoned.

(51) Int. Cl.
*C10G 1/10*     (2006.01)
*C10B 53/07*    (2006.01)
(Continued)

(52) U.S. Cl.
CPC .............. *C10G 1/10* (2013.01); *C10B 53/07* (2013.01); *C10G 1/002* (2013.01); *C10G 1/02* (2013.01);
(Continued)

(58) Field of Classification Search
None
See application file for complete search history.

(56) References Cited

U.S. PATENT DOCUMENTS 3,901,951 A * 8/1975 Nishizaki ................ C10B 49/10
                                                521/40.5
5,753,086 A * 5/1998 Guffey ....................... C10G 1/10
                                                196/116
(Continued)

FOREIGN PATENT DOCUMENTS

IN    IN/PCT/2002/01137        11/2005

OTHER PUBLICATIONS

FilomenaPinto; Pyrolysis of plastic wastes: 2. Effect of catalyst on product yield; Journal of Analytical and Applied Pyrolysis; vol. 51, Issues 1-2; Jul. 1999.
(Continued)

*Primary Examiner* — Tam M Nguyen
(74) *Attorney, Agent, or Firm* — Jason C. Cameron

(57) ABSTRACT

A process for production of useful hydrocarbon materials from plastic waste and reaction system therefor is provided. The process includes frequentatively thermolyzing of high molecular weight hydrocarbons such as plastic waste to produce useful medium molecular weight hydrocarbons and low molecular weight hydrocarbons. The process utilizes low molecular weight hydrocarbons as solution reactants which helps in reducing the viscosity of the material for more effective heat transfer. The process also includes addition of one or more low molecular weight olefins and solution reactants to high molecular weight hydrocarbons to augment the free radical environment. The process also includes hydrogenating and oxidizing the high molecular weight hydrocarbons. The process enables production of the useful, predominantly hydrocarbon materials such as waxes, lube oil base-stocks, refinery feedstocks, intermediates or fuel additives. The present invention also provides a reaction system comprising thermolysis reactor including a primary zone and an optional secondary zone for production of useful hydrocarbon materials from plastic waste.

15 Claims, 4 Drawing Sheets

(51) Int. Cl.
*C10G 1/00* (2006.01)
*C10G 1/02* (2006.01)
(52) U.S. Cl.
CPC ............ *C10G 2300/1003* (2013.01); *C10G 2300/302* (2013.01); *C10G 2300/4081* (2013.01)

(56) References Cited

U.S. PATENT DOCUMENTS

| | | |
|---|---|---|
| 6,861,568 B1 | 3/2005 | Guffey et al. |
| 9,200,207 B2 | 12/2015 | Huang et al. |
| 2004/0002622 A1 | 1/2004 | Gagnon |
| 2022/0064540 A1* | 3/2022 | Hemmings ............ C10G 1/02 |
| 2023/0139587 A1* | 5/2023 | DeBruin ................. C08J 11/12 252/373 |
| 2023/0212367 A1* | 7/2023 | DeBruin .................. C10J 3/00 521/47 |
| 2024/0010921 A1* | 1/2024 | Chakraborty .......... C10B 31/06 |

OTHER PUBLICATIONS

Mechanical and chemical recycling of solid plastic waste; Kim Ragaert et al; ResearchGate; 2017.
Moinuddin Sarker et al.; Mixture of LDPE, PP and PS Waste Plastics into Fuel by Thermolysis Process; 2013; International Journal of Engineering and Technology Research.

* cited by examiner

PROCESS FOR PRODUCTION OF USEFUL HYDROCARBON MATERIALS FROM PLASTIC WASTE

CROSS-REFERENCE TO RELATED APPLICATIONS

This Application is a continuation in part of a non-provisional patent application filed in the U.S. having patent application Ser. No. 17/002,445 filed on Aug. 25, 2020 and titled "PROCESS FOR PRODUCTION OF USEFUL HYDROCARBON MATERIALS FROM PLASTIC WASTE AND REACTION SYSTEM THEREFOR", now abandoned.

FIELD OF INVENTION

Embodiments of a present invention relates to recycling of plastic waste, and more particularly to a process for production of useful hydrocarbon materials from plastic waste.

BACKGROUND

Waste plastics, that is synthetic polymer-containing compounds, pose an environmental threat because of the difficulties associated with disposal and recycling of a large volume of non-biodegradable material. Over the years, incineration has become the most common method of dealing with combustible waste efficiently as it decreases the volume and mass of municipal solid waste. However, there is a lot of controversy about the incineration of plastic wastes, due to the release of greenhouse gases and toxic gases. An additional disadvantage of the traditional incineration method for disposal of plastic wastes is that it completely destroys all its organic matter which could be otherwise useful for different applications.

Wherefore, there is a growing need to recycle waste plastics. In past few decades, various technologies and methods have been developed which can recover energy or material from waste plastics and use the recovered energy or material as feedstock for the production of liquid fuels such as diesel, gasoline and fuel oil.

U.S. Pat. No. 2,372,001 discloses the production of unsaturated hydrocarbons of any desired chain length by thermal cracking of polyethylene resins (including copolymers of ethylene and other polymerizable organic compounds) using moderately high temperatures and low absolute pressures, such that the desired products report to the vapor phase and are collected by condensing. This patent recognizes that, under such conditions, side branch substituents tend to be removed from the main chain leaving behind a straighter chain molecule with a double bond. Thus, the total unsaturation of the product is a function of the extent to which the main chain is broken down plus an additional effect in cases where side branches can be removed to form relatively simple molecules, leaving a double bond on the main chain. The examples cited in the patent include the removal of acetic acid in the case of ethylene vinyl acetate copolymers and hydrochloric acid in the case of ethylene vinyl chloride copolymers. In both cases, resulting in an internal double bond on the main polymer chain with the side chain removed to form a simple molecule. The objective of the invention was to produce wax like substances (however containing significant unsaturation), to which end temperatures employed were between 325° C. and 550° C. The patent teaches that the pressure employed should be consistent with the products that it is desired to produce, which in the case of products in the wax range means vacuum conditions. Five out of the eight examples in the patent are at absolute pressures between 5 and 40 mmHg. Another example is at atmospheric pressure using $CO_2$ as a sweep gas. A third example is at higher pressure (300-500 psi), enabling alternative pathways and producing a different product slate. The final example was using a nickel catalyst.

The possibility to use the unsaturated hydrocarbons produced by the process as a feedstock in a variety of chemical reactions is discussed in the patent. The patent addresses in particular: condensation reactions with aromatic hydrocarbons (to produce alkyl benzenes), oxidation to carboxylic and hydrocarboxylic acids and reaction with sulfur followed by oxidation to form sulfonic acids.

W. G. Oakes et al., 1949, in their paper, The thermal degradation of ethylene polymers, published in J. Chem. Soc. Faraday Trans., disclosed how the different types of chemical bonds in polyethylene might have different rates of reaction with respect to thermally induced cracking. Prior work in the Chemical literature had typically assumed all carbon-carbon bonds equally likely to scission. Oakes and Richards work showed clearly that not all carbon-carbon bonds are the same. The paper considers three different types of unsaturation that are present in the pyrolysis fragments, and the mechanisms by which they form. The unsaturated fragments in question being vinyl R—$CH:CH_2$, internal olefin R—CH:CH—R' and side chain methylene RR"C:$CH_2$. The paper discloses, ethylene polymers breakdown by a complex mechanism in which more highly branched material is more reactive and therefore with commercial polymers (that initially contain significant side branches), the initial reaction rate is higher than final reaction rate, reasonable rate of reaction is possible at temperatures above 330° C., final product from thermolysis reactions contains the above mentioned three different types of unsaturation.

F. M. Rugg et al. of the Bakelite Company (part of Union Carbide), 1953, in their paper, Branching in polyethylene, published in Annals of the New York Academy of Science, disclosed branching in polyethylene synthesis which does not relate directly to thermal cracking of polymers but does explain some aspects of the underlying free radical reactions that are of great significance and which also apply in the context of cracking and rebuilding of hydrocarbons. The paper describes a mechanism in which the initial free radical reaction affecting a polymer chain is that of oxygen removing a secondary or tertiary hydrogen to form a secondary or tertiary free radical (unless specific measures are taken to exclude oxygen, it will be present in tens to hundreds of ppm levels when dealing with raw materials that have been in contact with the atmosphere). The principle chemical reaction of interest in the context of cracking of high molecular weight hydrocarbons is carbon-carbon bond scissioning, this reaction is one of the chain propagation reactions that can occur as the initially formed free radical reacts further. With chain scissioning, the free radical breaks down to a shorter chain free radical and the original chain terminated with either vinyl, internal olefin or side chain methylene groups as discussed above. In addition to these scissioning reactions, chain transfer reactions (where the free radical abstracts hydrogen from a different molecule or from a different place on the same molecule) are possible indeed are significantly favoured over scission reactions as well as over termination reactions. The termination reactions happen when two free radicals react together to form a stable molecule. Note that the addition of low molecular weight olefins (if present) to a free radical forms a side branch terminating in a free radical. Consequently, low molecular weight olefins can be added step wise to form branches of significant length. Consequently, in the event that there are light olefins present they are extremely likely to attach to a free radical center and grow a side branch.

Reading Oakes et al. (which is concerned with large molecules and teaches that there is typically a single olefin group per molecule on the average) in conjunction with Rugg et al., who teaches that the rate of reaction for addition reactions with ethylene is very large, it is reasonable to conclude that the reactivity of olefins with respect to addition reactions is strongly influenced by the molecular weight of the olefin. That is to say that light olefins will tend to form side branches while heavy olefins will react the same way as paraffins.

N. A. Slovokhotova et al., 1964, in their paper, Thermal degradation of polyethylene, published in Vysokomol soyed 6, disclosed the pyrolysis of polyethylene under vacuum at temperatures in the range 325° C. to 450° C. The work makes extensive reference to Oakes et al., cited above, and is mainly concerned with gaining understanding of secondary reactions, in particular accounting for different types of unsaturation. The paper shows the thermal degradation of polyethylene has been extensively researched for decades.

J. K. Y. Kiang et al., 1980, in their paper, Polymer reactions part VII: thermal pyrolysis of polypropylene, published in Polymer degradation and stability, disclosed how polypropylene preforms in fires, but is relevant in understanding products which are to be expected from polypropylene decomposition. Table 1 shows the products obtained from pyrolysis.

TABLE 1

THERMAL DECOMPOSITION PRODUCTS OF POLYPROPYLENE IN MOLE PER CENT

|  | 388° C.[a] | | 414° C.[b] | | 438° C.[c] | |
| --- | --- | --- | --- | --- | --- | --- |
| Product | Isotactic | Atactic | Isotactic | Atactic | Isotactic | Atactic |
| Methane | 0-5 | 0-5 | 0-6 | 0-4 | 0-5 | 0-6 |
| Ethane | 3-3 | 2-7 | 4-5 | 2-6 | 3-7 | 3-2 |
| Propylene | 15-7 | 19-3 | 24-0 | 22-8 | 22-6 | 27-9 |
| Isobutylene | 3-0 | 4-4 | 3-1 | 4-4 | 4-0 | 3-4 |
| 2-Pentene | 18-9 | 19-4 | 22-7 | 21-2 | 19-1 | 18-2 |
| 2-Methyl-1-pentene | 12-3 | 12-9 | 12-0 | 10-4 | 10-6 | 11-9 |
| 3-Methyl-3,5-hexadiene | 1-0 | 1-0 | 1-2 | 1-3 | 1-4 | 1-6 |
| 2,4-Dimethyl-1-heptene | 33-6 | 30-8 | 23-0 | 28-3 | 29-7 | 25-4 |
| 2,4,6-Trimethyl-1-heptene | 1-0 | 1-1 | 1-0 | 1-3 | 1-3 | 1-4 |
| 4,6-Dimethyl-2-nonene | 1-9 | 1-4 | 1-1 | 0-8 | 0-9 | 0-8 |
| 2,4,6-Trimethyl-1-nonene | 7-8 | 5-9 | 6-3 | 5-7 | 5-4 | 4-8 |
| $C_{13}H_{22}$ | 0-8 | 0-7 | 0-6 | 0-6 | 0-9 | 0-8 |

[a]Time of pyrolysis, 60 min.
[b]Time of pyrolysis, 3 min.
[c]Time of pyrolysis, 3 min.

The polypropylene tends to breakdown readily into naphtha and distillate range materials at temperatures around 400° C. Consequently, it is to be expected that polypropylene will break down more readily than polyethylene due to the large number of tertiary hydrogens present. What is interesting is that certain molecules are highly favoured, regardless of whether the material is isotactic or atactic. The interpretation in the case of waste plastic is that it is possible to crack the polypropylene content down to naphtha range material and fuel gas. The naphtha in question is highly branched therefore a good gasoline material.

U.S. Pat. No. 3,441,628 discloses production of wax like low molecular weight, substantially linear ethylene polymers and copolymers by thermal degradation of high molecular weight ethylene polymers and copolymers. Using temperatures between 360° C. to 420° C. and residence times 30 seconds to 5 hours.

U.S. Pat. No. 3,441,628 discloses importance of feeding the polymer into a melt of partially degraded material with intense stirring so that the temperature within the reacting mass is uniform.

U.S. Pat. No. 3,441,628 discloses various examples for both batch and continuous processes. In the batch version, the equipment is essentially an autoclave and plastic is added to a melt already present. In the continuous case, there is a vigorously stirred reactor and a plug flow section. This manipulates the residence time distribution so that no material has a zero-residence time which is advantageous when dealing with polymer range materials as it ensures that no unreacted polymer is able to avoid the reaction zone. The product is generally the material directly from the reactor, with no further processing described.

U.S. Pat. Nos. 8,378,161 and 8,446,332 describe method and apparatus for microwave depolymerization of hydrocarbon feedstocks deal with the continuous depolymerization of high molecular weight organic feedstocks using microwave energy.

These patents teach the importance of good mixing conditions to obtain reasonably uniform temperature and discuss the relationship between extent of material breakage and viscosity, however, still marred with one or the other drawbacks.

Hence, there is need for an efficient process for production of useful hydrocarbon materials from waste plastic.

SUMMARY

In accordance with an embodiment of the invention, process for production of useful hydrocarbon materials from plastic waste is provided. The process includes mixing high molecular weight hydrocarbons, and lower molecular weight hydrocarbons to obtain a uniform mixture representative of low viscosity dissolved polymer phase. The high molecular weight hydrocarbons being selected from a group consisting shredded waste plastic, un-shredded waste plastic, high boiling hydrocarbons and combination thereof. The uniform mixture comprises 70% wt-30% wt of the high molecular weight hydrocarbons, and 30% wt-70% wt of the lower molecular weight hydrocarbons. The process also includes heating the uniform mixture to obtain a molten state. The process includes separating heavy contaminants and light contaminants from molten uniform mixture prior to thermolysis reaction. The process also includes frequentatively thermolyzing the molten uniform mixture at a predefined temperature, pressure and duration to initiate free radical chemical reactions and causing breakdown of the uniform mixture. The predefined temperature ranges from 350° C. to 425° C., the predefined pressure ranges from 3-20 bar, and predefined duration ranges from 1 to 4 hours. The process also includes separating thermolyzed uniform mixture into three streams, wherein the three streams comprise dissolved hydrocarbon gases including light naphtha range material, naphtha through light wax material, and a crude thermolyzed product material. The process further includes conducting a short path distillation (SPD) to separate the crude thermolyzed product into fractions. The SPD is being conducted at a temperature of 360° C.

In accordance with another embodiment of the invention, high molecular mass, generally hydrocarbon materials (such as residual material from crude oil, residual material recovered from the oil produced by pyrolysis of tires), herein referred to as "residuum" may take the place of mixed waste plastic, in all or in part in any proportion up to 100%.

In accordance with yet another embodiment of the invention, three streams are recycled by supplying back to at least one step of the mixing of high molecular weight hydrocarbons and lower molecular weight hydrocarbons, the heating of the uniform mixture, and the frequentatively thermolyzing molten uniform mixture, independently.

In accordance with an embodiment of the invention, one or more low molecular weight olefins selected from a group comprising, 1-octene and 1-hexene are added to the step of the mixing of high molecular weight hydrocarbons and lower molecular weight hydrocarbons to undergo supplementary reactions in a free radical environment.

In accordance with another embodiment of the invention, solution reactants are added after the thermolysis and before hydrotreating process to reduce viscosity of the product to accelerate a hydrogenation process.

In accordance with yet another embodiment of the invention, high molecular weight hydrocarbons from feed or product of short path distillation are hydrogenated.

In accordance with an embodiment of the invention, high molecular weight hydrocarbons from feed or product of short path distillation are oxidized.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
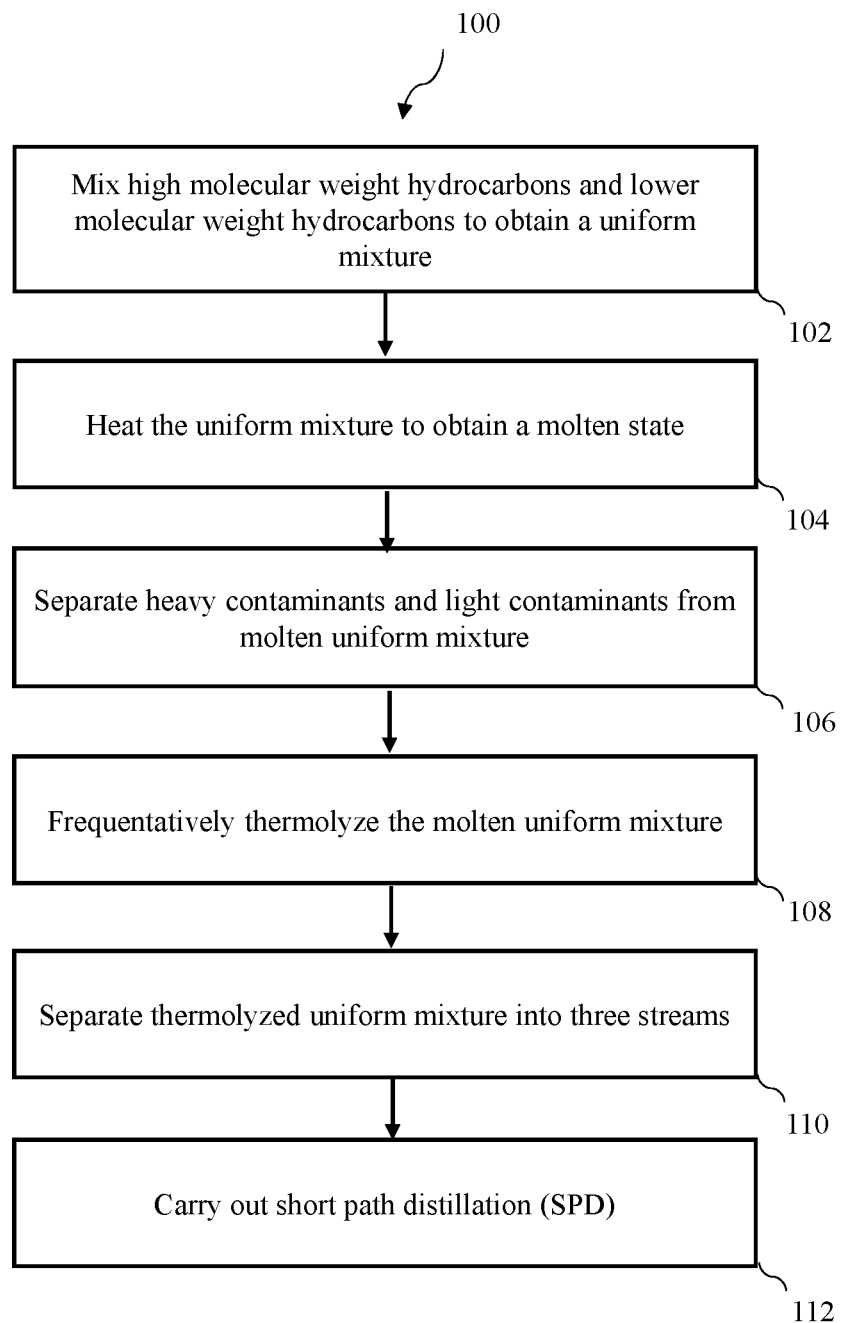
FIG. 1 is a flow diagram representing steps involved in a process for production of useful hydrocarbon materials from plastic waste, in accordance with an embodiment of the present invention.

Further, those skilled in the art will appreciate that elements in the figures are illustrated for simplicity and may not have necessarily been drawn to scale. Furthermore, in terms of the method steps, chemical compounds, and parameters used herein may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more components, compounds, and ingredients preceded by "comprises . . . a" does not, without more constraints, preclude the existence of other components or compounds or ingredients or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

As used herein, the term "high molecular weight hydrocarbons" refers to materials containing a large number of carbon atoms per individual molecule, typically above 100 but in some cases above 100,000. The materials predominantly contain carbon and hydrogen but may contain lesser amounts of nitrogen, oxygen and sulfur. In this sense the term hydrocarbon is used loosely which is common practice by those skilled in the art, for example the periodical "Hydrocarbon Processing" deals with mainly petroleum and petrochemicals, not all of which are "hydrocarbons" in a strict chemical sense but rather are hydrocarbons in the looser sense as in the "Hydrocarbon Industry". In the sense used in this disclosure, "high molecular weight hydrocarbon" encompasses polymers such as polyethylene, polypropylene and polystyrene (which are also hydrocarbons in the strict sense) but also includes materials such as polyamides and polyesters, which also include lesser amounts of oxygen and nitrogen as well as heavy fractions from petroleum, which also contain hetero-atoms, but are predominantly composed of carbon and hydrogen. The materials envisioned are liquid at ambient temperature and either melt or dissolve into the "lower molecular weight hydrocarbons" as the temperature is increased above ambient and are either molten or dissolved at 200° C.

As used herein, the term "lower molecular weight hydrocarbons" refers to materials consisting of molecules predominantly containing carbon and hydrogen with typically fewer than 20 carbon atoms. More typically having between 5 and 16 carbon atoms. The materials can be mixtures of hydrocarbons of different molecular weights and may contain hetero-atoms but are predominantly composed of carbon and hydrogen. The materials envisioned within the definition are liquid at ambient temperature.

As used herein, the term "medium molecular weight hydrocarbons" refers to materials consisting of with typically 20 to 100 carbon atoms. Moreover, the term hydrocarbon should be considered loosely defined so as not to exclude materials that contain small amounts of nitrogen, oxygen and sulfur.

As used herein, the term "high boiling hydrocarbons" refers to materials consisting predominantly of carbon and hydrogen with an atmospheric boiling point above that of liquid hydrocarbon fuels, for example vacuum residue from petroleum refining.

As used herein, the term "heavy contaminants" refers to materials which may be present in waste plastics and similar substances, which are not significantly soluble in molten plastics or in the low molecular weight hydrocarbons which are used as solvents, and which have a density which exceeds that of the "hydrocarbon" materials. Typical examples are materials such as sand and metals that have densities well in excess of the "hydrocarbons".

As used herein, the term "light contaminants" refers to materials which may be present in the waste plastics and similar substances, which are not significantly soluble in molten plastics or in the low molecular weight hydrocarbons which are used as solvents, and which have a density which is below that of the "hydrocarbon" materials, such that the contaminants are able to float on a pool of liquid.

Embodiments of the present invention relates to a process for production of useful hydrocarbon materials from plastic waste. The process mainly focuses on frequentative thermolysis process.

The present invention deals with the production of useful, predominantly hydrocarbon materials such as waxes, lube oil base-stocks, refinery feedstocks, intermediates or fuel additives from high molecular weight hydrocarbon materials such as plastic waste with possible supplementary use of low molecular weight hydrocarbon materials. The present invention uses low molecular weight hydrocarbon materials as "solution reactants", functioning as solvents or swelling agents for the high molecular weight materials. The solution reactant helps in reducing the viscosity of the material for more effective heat transfer. The solution reactant also function as selective solvents for the secondary purpose of dissolving the more desirable materials for the process (such as aliphatic resins) while leaving fewer desirable materials (such as highly polar resins and inert fillers) as undissolved solids or immiscible liquids. Further, in certain cases the solution reactant acts as a reactant, combining with fragments from the plastic to form new substances.

In an embodiment, the process for production of hydrocarbon materials from at least one of plastic waste and high boiling hydrocarbons or combination thereof is provided.

FIG. 1 is a flow diagram 100 representing steps involved in the process for production of useful hydrocarbon materials from plastic waste, in accordance with an embodiment of the present invention.

The process for production of hydrocarbon materials begins with mixing high molecular weight hydrocarbons, and lower molecular weight hydrocarbons to obtain a uniform mixture representative of low viscosity dissolved polymer phase at step 102. The high molecular weight hydrocarbons being selected from a group consisting shredded waste plastic, un-shredded waste plastic, high boiling hydrocarbons and combination thereof. The lower molecular weight hydrocarbons are selected from a group consisting of naphtha/distillate range material, n-paraffin, decalin, coker gas oils and diesel. The uniform mixture comprises 70% wt-30% wt of the high molecular weight hydrocarbons, and 30% wt-70% wt of the lower molecular weight hydrocarbons. In one embodiment, the uniform mixture comprises 40% wt of the high molecular weight hydrocarbons, and 60% wt of the low molecular weight hydrocarbons.

The use of shredded plastic is convenient in the process. However, it is possible to deal with the un-shredded plastic. The un-shredded plastic is used by mechanically circulating a hot liquid on the un-shredded plastic. The hot liquid includes solution reactant, wax, or plastic mixture.

The process may also be applied to high boiling hydrocarbons or other heavy materials which may substitute for waste plastic in any proportion up to 100%. In an embodiment, the other heavy material include high molecular mass or high boiling hydrocarbon materials such as, but not limited to, residual material from crude oil, residual material recovered from the oil produced by pyrolysis of tires, herein referred to as "residuum".

In an embodiment, the uniform mixture is heated to obtain a molten state at step 104. The uniform mixture is heated at temperature ranging from 180° C. to 250° C.

In alternative embodiment, the process may start with heating the low molecular weight hydrocarbons and then adding the high molecular weight hydrocarbons over time while continuing heating to finish with a uniform mixture at a temperature between 180° C. and 250° C.

In an embodiment, heavy contaminants and light contaminants are separated from molten uniform mixture prior to thermolysis reaction at step 106. The separating the heavy contaminants and light contaminants from the molten uniform mixture enables removal of impurities from the high molecular weight hydrocarbons. The heavy contaminants may include sand and iron wire fragments. The light contaminants may include closed cell ceramic foam and possibly cellulosic materials. The heavy contaminants are macroscopic fragments that has a higher specific gravity than the molten uniform mixture and the light contaminants are fragments that are insoluble in the molten uniform mixture.

In an embodiment, the molten uniform mixture is frequentatively thermolyzed at a predefined temperature, pressure and duration to initiate free radical chemical reactions and causing breakdown of the uniform mixture at step 108. The predefined temperature ranges from 350° C. to 425° C., the predefined pressure ranges from 3-20 bar, and predefined duration ranges from 1 to 4 hours. The frequentatively thermolyzing of the molten uniform mixture is carried out at 15 bar pressure. The pressure, temperature and residence time are selected so that the short to medium length hydrocarbons are able to participate in the free radical reactions (in addition to the long chain hydrocarbons). This is accomplished by using moderately high pressure to ensure such materials are significantly present in the liquid phase at process temperature. The process temperature may range from 350° C. to 425° C. and it is selected so that reaction rate remains moderate and consequently the process is controllable and coke formation is suppressed. The residence time is typically relatively long, from 1 to 4 hours consistent with the deliberate, relatively slow rate of reaction.

The small to medium sized molecules present in a liquid phase are liable to lose a hydrogen atom to become a free radical (due to chain reaction with pre-existing free radicals, i.e., by chain-transfer reaction). Such low molecular weight free radicals readily disproportion into a smaller radical and an olefinic fragment. The olefin fragment being of low carbon number is highly active (compared to other materials present) and readily attaches as a side chain to a free radical in the substrate molecule. Alternatively, the free radicals initially formed (or the free radical fragment remaining after an olefin has formed) participate in the free radical chain reactions, including possibly chain termination by attaching to the free radical in the substrate. As a consequence, the process is able to convert at least a portion of less desirable naphtha and/or distillate range molecules into lightly branched higher molecular weight molecules.

The high molecular weight hydrocarbons crack to mainly wax range materials with a less amount of liquid range materials and lesser gas range materials. The low molecular weight hydrocarbons initially crack to smaller olefins and paraffins. The olefins attach to the wax range material making it more highly branched while the paraffins are less reactive but eventually are able themselves to react to form smaller olefin and paraffin fragments. Consequently, if reaction is continued for a very long time, the final material has a broad molecular weight distribution with less amount of very high molecular weight hydrocarbons, a large amount of medium molecular weight hydrocarbons (somewhat branched chain) and low molecular weight predominantly paraffinic material.

In such an embodiment, thermolyzed uniform mixture is separated into three streams at step 110. The three streams comprise dissolved hydrocarbon gases including light naphtha range material, naphtha through light wax material, and a crude thermolyzed product material. The crude thermolyzed product material from the three streams comprise heavy waxes with molecular weight ranging from 1,500 to 6,000 Dalton.

In one embodiment, the steps 102 to 110 are operated intermittently in a batch mode. The batch mode is configured to convert medium molecular weight hydrocarbons produced during breakdown of the high molecular weight hydrocarbons to low molecular weight hydrocarbons.

The process in the batch mode is carried out using batch distillation as a product (crude thermolyzed product material) recovery step. The batch distillation is carried out in at least one of a thermolysis reactor and a separate equipment which is specifically designed for the purpose. In either situation, the large mass of material is maintained at a high temperature, however somewhat lower than the thermolysis temperature to slow down the rate of reaction. The steps 102 to 110 are performed in this embodiment under reduced to atmospheric pressure. Thereafter, the temperature is maintained while the pressure is further reduced using vacuum equipment. Reducing the pressure at this stage is typically advantageous. This is feasible using several boosters (such as roots blowers) with a primary vacuum pump (such as a liquid ring pump). Initially the boosters operate at low speed and the vacuum is essentially provided by the primary vacuum pump. Distillate material gradually becomes heavier as the distillation continues and can be collected in fractions. It is possible to automate the collection by fractions with fractions defined by melting point using a device such as that depicted in FIG. 4 (described later).

In another embodiment, the steps 102 to 110 are operated in a continuous mode. The process in the continuous mode includes feeding shredded plastic waste with recycled liquid and recycled heavy wax into a heated, well stirred tank known as a melter or dissolver. The shredded plastic waste comprises clean recycle polyethylene (PE) or mixed waste plastic, which may have contaminants within reason. The melter is maintained at a temperature ranging from 180° C. to 250° C. using a steam, hot oil or electric coil. The melter is maintained at atmospheric pressure, which is convenient for addition of the shredded plastic waste. The electric coil used with wall temperature limited to 400° C. or less. The melter therefore contains a solution of molten plastic and wax in hydrocarbon liquid together with minor amounts of contaminants (heavy contaminants and light contaminants) which came with the plastic and recycled wax. For example, small amounts of polar resins (such as PET), paper from labels, inorganic materials from pigments and fillers, or possibly coke from downstream. The heavy contaminants and the light contaminants from the solution of molten plastic and wax in diesel is separated prior to thermolysis reaction. The vapours from the melter are continuously withdrawn and condensed. Condensate thus collected is added to the thermolysis reactor. The frequentative thermolysis reaction is carried causing breakdown of the solution of molten plastic and wax in diesel. The solution of molten plastic and wax in diesel is separated into the three streams, wherein the three streams comprise the dissolved hydrocarbon gases including light naphtha range material, the naphtha through light wax material, and the crude thermolyzed product material. This is a unique aspect of the present invention.

In the continuous mode of the process for production of useful hydrocarbon materials from plastic waste, the thermolysis reactor consist of a continuous stirred tank reactor (CSTR) followed by a plug flow reactor (PFR) (not shown in figure). Residence time of the CSTR is maintained significantly higher than that of the PFR. The PFR is adapted to avoid any possibility of unreacted plastic bypassing. A system employing the CSTR followed by the PFR confers the ability to engineer both the residence time distribution and the temperature history of the material.

Further in an embodiment, short path distillation (SPD) is carried out to separate the crude thermolyzed product material into fractions at step 112. The SPD being carried out at temperature 360° C. Using higher than typical SPD temperatures reduces cost by requiring less extreme vacuum and the associated equipment.

In a further embodiment of the process for production of useful hydrocarbon materials from plastic waste, the process comprises recycling each of the three streams by supplying back to at least one step of the mixing of high molecular weight hydrocarbons and lower molecular weight hydrocarbons, the heating of the uniform mixture, and the frequentatively thermolyzing molten uniform mixture, independently. The recycling of the three streams by supplying back comprises supplying the light naphtha range material as fuel to provide a hot utility required for the process (for example to supply the fuel for a hot oil system or for direct heating). The recycling of the three streams by supplying back comprises supplying back the stream of naphtha through light wax as solution reactant to the mixing step. All the aliphatic molecules that are not in the desired size range for the products are recycled back to a thermolysis reaction zone (frequentative thermolysis) as part of the solution reactant material.

The recycled solution reactant material (similar hydrocarbons as the lower molecular weight hydrocarbons) has beneficial actions such as a high affinity for aliphatic resins (such as polyethylene and polypropylene), a much lower affinity for polar resins (such as polyethylene terephthalate and PVC) and inert solids (such as coke and fillers) and consequently enables a degree of separation of the materials (such as PE and PP) that are precursors to desirable waxy molecules from materials (such as PET and PVC). The solution reactant greatly reduces the viscosity of the melt which facilitates efficient heat transfer and also makes it possible to separate undesirable materials (solids and incompatible melts or liquids) from the desirable materials, either by settling or filtration.

In a further embodiment of the process for production of useful hydrocarbon materials from plastic waste, the process comprises adding one or more low molecular weight olefins to the step 102. The low molecular weight olefins are selected from a group comprising maleic anhydride, 1-octene and 1-hexene, such materials being available to react with the substrate material in a free radical environment. The addition of low molecular weight olefins, such as 1-octene and 1-hexene increases the amount of branched chain material in the product as these materials typically graft to the substrate to form a short side chain of 8 or 6 carbon atoms respectively. The addition of maleic anhydride introduces alkenyl succinic anhydride functionality to the product of the thermolysis reaction. Since maleic anhydride is an extremely polar material, thus has limited solubility in aliphatic solvent and consequently only a limited amount of maleic anhydride is introduced. The amount of maleic anhydride can be increased by selecting a solvent which has higher capacity for maleic anhydride while retaining adequate solvency for the polyolefins. For example, decalin or the commercially available eutectic mixture of biphenyl and diphenyl ether (known as Dowtherm A). The maleic anhydride can be gradually added during the course of the reaction using a volatile solvent with high capacity for maleic anhydride, such as tetrahydrofuran. In such case, the solvent or maleic anhydride mixture can be added drop-wise over the course of the reaction.

In a further embodiment of the process for production of useful hydrocarbon materials from plastic waste, the process comprises adding the solution reactants after the thermolysis and before hydrotreating process to reduce viscosity of the crude thermolyzed product material to accelerate a hydrogenation process. The adding of the solution reactants after the thermolysis enables separation of waxy molecules from non-waxy molecules by differential solidification. The solution reactants comprise similar hydrocarbons as the lower molecular weight hydrocarbons.

In a further embodiment of the process for production of useful hydrocarbon materials from plastic waste, the process comprises hydrogenating the high molecular weight hydrocarbons from feed (mixing step) or product (fractions) of the short path distillation. The hydrogenating is a type of hydrotreating process. The hydrogenating of the crude thermolyzed product or of the separated cuts (fractions) from the crude thermolyzed product (after SPD) may be accomplished by any known means. It is typically convenient to hydrogenate materials which are to be sold as finished waxes. The hydrogenating saturates olefinic bonds which improves color of the material (the product). In absence of the hydrogenating such materials (the product of the SPD) tend to be yellow to brown due to presence of conjugated diolefins. After the hydrogenating the color is improved to ivory to white. The most convenient method for the hydrogenating at large scale is to use a batch hydrogenation using a stirred batch reactor with a gas induction impeller. The batch hydrogenation is carried out using 1% wt to 5% wt Raney nickel or a supported nickel catalyst at a pressure of 10 to 30 bar, a temperature of 180 to 230° C. and a residence time of 1 to 8 hours. After the hydrogenation the catalyst is removed by settling and filtration and is reused.

A further embodiment of the process is a method to produce essentially straight chain materials (n-paraffins) from feed rich in polyethylene. This embodiment exploits the fact that the most common polyethylene materials available are actually comonomers of ethylene and 1-butene and as such have ethyl side branches. Since ethyl side branches are very stable, compared to longer branches, thermolysis is more likely to result in scission of the carbon-carbon bond in what would normally be described as the main chain. This leads directly to one of two distinct types of molecules:

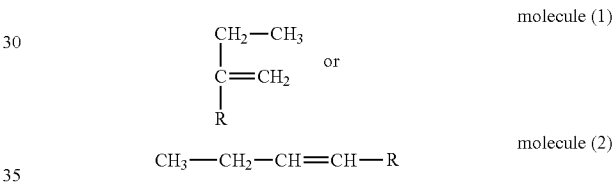

The molecule (1) is more common and accounts for approximately 70% of the total of the above two types of molecules.

After hydrogenation, the molecule (1) and molecule (2) convert into the following:

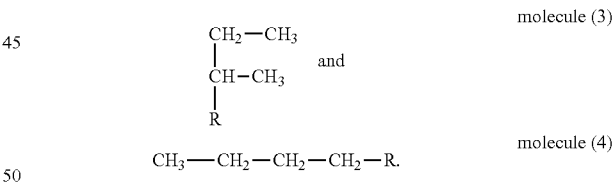

Note that after hydrogenation, ~30% of the material is straight chain and 70% is lightly branched having a methyl group on the $3^{rd}$ carbon from chain end. In many cases such material is sufficiently straight chained. The presence of the methyl group in a predictable place ($3^{rd}$ carbon from chain end) makes it possible for such materials to crystalize more easily than equivalent materials with the side branch randomly assigned. However, in cases where minimizing the amount of branched chain materials is important, it is possible to obtain fully normal paraffin material by subjecting such hydrogenated materials to a second thermolysis treatment. The methyl branch on the third carbon is a quite stable group and additional thermolysis will involve scission on the main chain, either removing 2-butene or removing 2-methyl 1-butene, in either case the mildly branched material is replaced by an unbranched molecule containing 4 or 5 fewer carbon atoms. The resulting molecules are typically hydrogenated and separated a second time; however, the additional processing helps in production of a high yield of n-paraffinic material.

In a further embodiment of the process for production of useful hydrocarbon materials from plastic waste, the process comprises oxidizing the high molecular weight hydrocarbons from feed (mixing step) or product (fractions) of the short path distillation. The oxidizing is optional for the heaviest wax materials. The oxidizing is carried out in a batch of molten wax at a temperature between 100 and 200° C. while bubbling air through pool of the molten wax for a duration of 1 to 8 hours. The oxidizing significantly changes physical properties of the wax and can be beneficial for certain applications. In general, the oxidizing increases polarity of the wax, reduces hardness and increases tackiness. Oxidized wax by this process is appropriate for such applications as shoe and furniture polishes.

The present invention also provides for a reaction system designed specifically for production of hydrocarbon materials from plastic waste.

Figure 2:
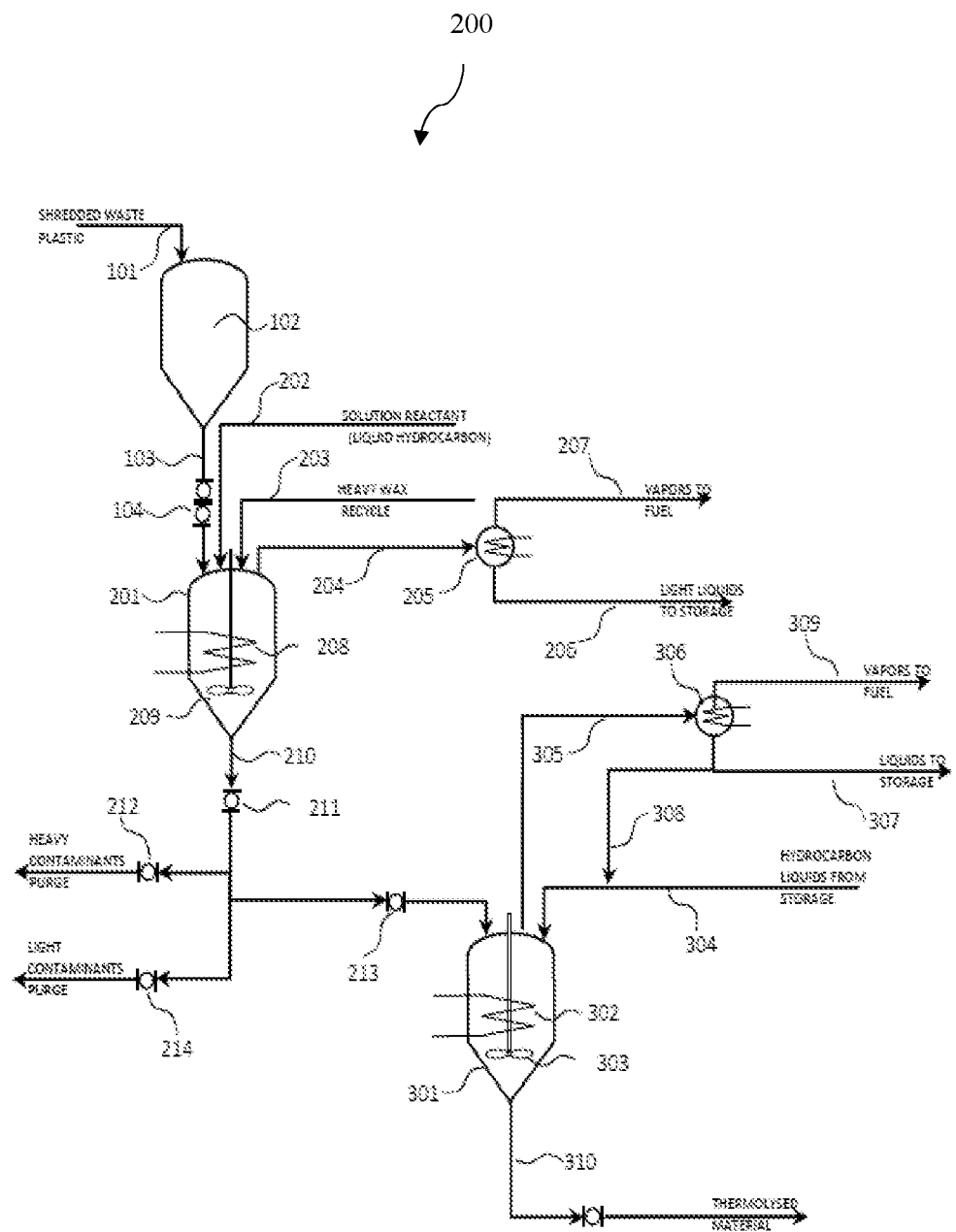
FIG. 2 is a schematic representation of a reaction system used for batch mode thermolysis reaction, in accordance with an embodiment of the present invention.

FIG. 2 is a schematic representation of the reaction system 200 used for batch mode thermolysis reaction, in accordance with an embodiment of the present invention.

In an embodiment, the reaction system 200 comprises at least one surge hopper 102 adapted to receive high molecular weight hydrocarbons via a flowline 101. The surge hopper 102 also enables delivery of the high molecular weight hydrocarbons at a predetermined rate to the melter 201 via a flowline 103. The high molecular weight hydrocarbons being selected from a group consisting shredded waste plastic and un-shredded waste plastic.

In an embodiment, the reaction system 200 comprises the melter 201 fluidically connected to the at least one surge hopper 102 via first set of one or more valves 104. The melter 201 comprises one or more openings to receive at least one of the low molecular weight hydrocarbons as solution reactant, the heavy wax, and one or more openings to release dissolved hydrocarbon gases including light naphtha range material from the melter 201, and a molten uniform mixture of the high molecular weight hydrocarbons and the low molecular weight hydrocarbons. The melter 201 receives the solution reactant through a flowline 202. The melter 201 receives the heavy wax through a flowline 203 from holding tanks using pumps or other conventional methods to induce flow such as gravity or head-space pressure. The melter 201 first receives heavy wax, secondly the solution reactant and finally the high molecular weight hydrocarbons. The particular sequence of receiving the components helps in maintaining the low viscosity in the melter 201.

The melter 201 is adapted to mix the high molecular weight hydrocarbons and the lower molecular weight hydrocarbons, via mixing means 209, to obtain a uniform mixture representative of low viscosity dissolved polymer phase. The mixing means may comprise of an agitator or impeller, alternatively mixing may be obtained by circulating liquid externally using a pump. The melter 201 is also adapted to heat the uniform mixture to yield a molten state, alternatively to heat the liquid prior to addition of the solids over time so that the material remains "pumpable" (low viscosity) throughout the process. The heating of the uniform mixture may be performed at temperature ranging from 180° C. to 250° C. The low molecular weight hydrocarbons are selected from a group consisting of naphtha/distillate range, n-paraffin, decalin, diphenyl ether, coker gas oils and diesel. The melter 201 also comprises heating coil 208 to provide at least part of the heat needed to melt the plastic. The part of the heat needed to melt the plastic is received by hot recycled wax. The hydrocarbon vapours may be formed in the melter 201 as a result of heating. A vapour flowline 204 connects the vapor phase of the melter 201 to a condenser 205 which recovers liquid from the vapours. The recovered liquid is directed towards storage via flowline 206 and releases uncondensed vapours via flowline 207. The recovered liquid is separately directed towards the thermolysis reactor 301. The fraction of recycled liquid which is able to evaporate ranges between 0% to 20% of total recycled liquid.

Once the molten state of uniform mixture is obtained, the heavy contaminants and the light contaminants are manually separated from the molten uniform mixture. The manual separation of the heavy contaminants and the light contaminants is carried using a sight glass and manual valves. The separation can be automated based on an online physical measurement such as infra-red spectroscopy or can be passively automated using density differences to open and close appropriate paths for the discharged material. A flowline 210 is directed towards a valve 211 which is closed during the dissolution cycle and opened to allow the molten uniform mixture to flow towards valves 212, 213 and 214. The valve 212 is adapted to purge the heavy contaminants. The valve 213 is adapted to direct the molten uniform mixture to the thermolysis reactor 301. The valve 214 is adapted to purge the light contaminants. The sequence of operation is such that, the valve 212 is opened first, until the appearance of the draining liquid, or continuously measured density (or other convenient property) indicates that the heavy contaminants have been purged. The valve 212 is then closed and the valve 213 is opened until light contaminants are detected. The valve 213 is then closed and the valve 214 is opened to purge the light contaminants. The molten uniform mixture may contain small amounts of solids and entrained liquids. These may be removed between the melter 201 and thermolysis reactor 301 using suitable filters such as a cartridge filter (not shown in the FIG. 2). Transferring the molten uniform mixture to the thermolysis reactor 301 may be done using a pump, head space pressure differential or gravity as convenient.

In an embodiment, the reaction system 200 comprises the thermolysis reactor 301 fluidically connected to the melter 201 via second set of one or more valves 213. The thermolysis reactor 301 being operated at isothermal condition by soft heating by circulating hot oil. The thermolysis reactor 301 comprises a primary zone, an optional secondary zone, one or more openings to receive hydrocarbon liquids, and one or more openings to release at least one of a vapour phase of the thermolysis reactor 301 and a thermolyzed material. The thermolyzed material comprises at least three streams comprising dissolved hydrocarbon gases, including light naphtha range material, naphtha through light wax material, and a crude thermolyzed product material.

The thermolysis reactor 301 also comprises a heating coil 302 and a gas induction agitator 303. The heating coil 302 provides a heat required for thermolysis reaction. The gas induction agitator 303 ensures proper mixing of components of the thermolysis reactor 301. The thermolysis reactor 301 is operated at a temperature ranging from 350° C. to 425° C. and at pressure about 20 bar for a duration ranging from 30 minutes to 4 hours. The thermolysis reactor 301 headspace can be filled with either nitrogen or hydrogen prior to commencing the thermolysis reaction. Trace amounts of oxygen play a role as initiators of the free radical reactions. The oxygen required for initiating free radical rection is entrained either with the molten uniform mixture initially fed to the thermolysis reactor 301 or in the nitrogen stream.

A flowline 305 is directed towards a condenser 306 adapted to condense vapours coming out of the vapour phase of the thermolysis reactor 301. The condensed liquid from the condenser 306 being removed via flowline 307 and directed towards the storage or back to the thermolysis reactor 301 via flowline 308. The condensed liquid may be sent to the storage and an equal amount of liquid pumped from the storage via flowline 304. The uncondensed vapours are directed to the fuel system via flowline 309. The pressure in the thermolysis reactor 301 is controlled by modulating the amount of vapour flow from the condenser using a conventional pressure control loop. The purpose of the condenser 306 during the thermolysis reaction is to recover material as liquid for recycle to the thermolysis reaction, so initially the condenser 306 operates with effectively 100% reflux and retention of all molecules within the thermolysis reactor 301.

The primary zone is adapted to react the molten mixture in the condensed phase at a moderate temperature with a relatively long residence time. The moderate temperature applied in the primary zone for reacting the molten mixture ranges from 325° C. to 450° C. A vapor zone is always present above the primary zone and in all cases vapor from the vapor zone is recirculated through the liquid in the primary zone. The vapor space may optionally function as a secondary zone, which employs high temperature and short residence time to crack vapor phase components. This requires suitable optional secondary zone heating such as an electrical coil (not shown). The optional secondary zone is adapted to produce low molecular weight olefins (predominantly ethylene and propylene) from low molecular weight hydrocarbons. For example, by inclusion of a heating coil within the optional secondary zone which has a surface temperature between 500° C. and 1000° C., preferably between 600° C. and 750° C.

The optional secondary zone is incorporated within the vapor phase of the thermolysis reactor 301 that operates using a gas induction agitator 303 to circulate gases through the reacting liquid bulk.

The low molecular weight hydrocarbons crack to small olefins during the short residence time of the optional secondary zone at temperature above 650° C. The resulting vapor from the optional secondary zone contain a significant amount of low molecular weight olefins in particular ethylene and propylene. The hot gases or vapours leaving the optional secondary zone are immediately quenched in the primary zone. The ethylene, propylene and other low molecular weight olefins attach to the liquid phase material in the primary zone to form side branches. The use of such a secondary thermolysis zone effectively eliminates naphtha range liquids and significantly increases the degree of branching of the primary zone product which is useful when a branched chain material is the target product such as the case of lube base stock.

After the reaction has been substantially completed, the thermolysis reactor 301 is gradually depressurized. The depressurization is accomplished by directing the liquid phase from the condenser 306 to storage rather than reflux. (the pressure control valve which directs vapour phase to fuel gas will tend to close as the low molecular weight hydrocarbons are sent to storage rather than refluxed). A significant amount of vapor flushes off during this process and is condensed in the condenser 306 of the thermolysis reactor 301. The rate of cooling of the thermolysis reactor 301 is dependent on the sizing of the condenser 306. As the thermolysis reaction time progresses the condensed material gradually increase in carbon number, starting out as a naphtha range material and finishing up as distillate making possible (but not essential) to send the liquid to different tanks as the molecular weight changes, which is done automatically, for example based on density. As a result, sufficient light liquid is retained as a supplementary fuel while the heavier liquid is all recycled to extinction.

After the depressurization of the thermolysis reactor 301 above atmospheric pressure, the crude thermolyzed material is transferred via flowline 310 to the crude thermolyzed material storage tank.

Figure 3:
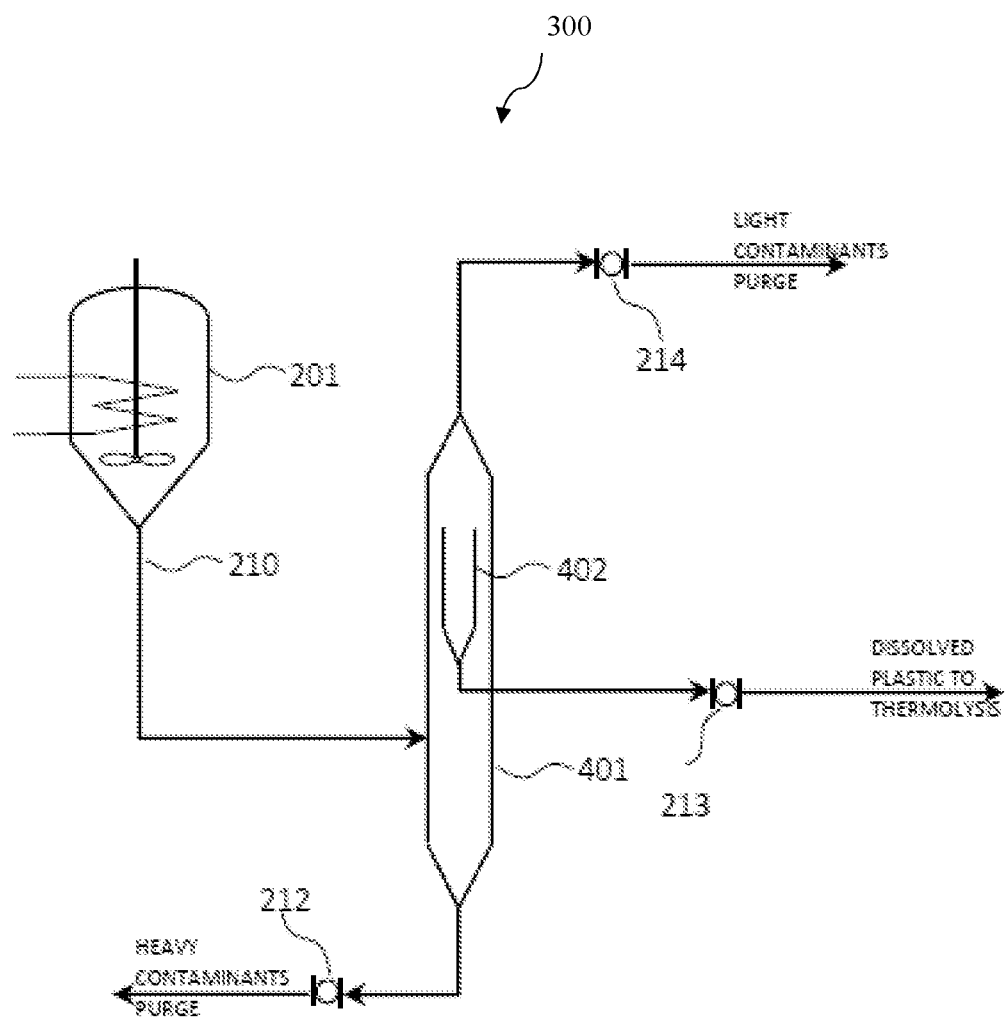
FIG. 3 is a schematic representation of a riser for automated separation of heavy contaminants and light contaminants from the uniform mixture flowing from the melter, in accordance with an embodiment of the present invention.

FIG. 3 is a schematic representation of the riser 401 for automated separation of heavy contaminants and light contaminants from the uniform mixture flowing from the melter 201, in accordance with an embodiment of the present invention.

In a further embodiment of the reaction system 200, the reaction system 200 comprises a riser 401 and downcommer 402 combination fluidically connected to the melter 201 via third set of one or more valves. The riser 401 and downcommer 402 combination operates as a trap which separates light and heavy contaminants from the molten uniform mixture and automatically directs the heavy contaminant and light contaminants to separate zones for removal and disposal.

The riser 401 receives the molten uniform mixture via the flowline 210. The riser 401 is sized so that the up flow velocity remains low, thereby enabling settling of the heavy contaminants against the rising flow. The heavy contaminants are purged periodically via the valve 212. The light contaminants are purged from the riser 401 via the flowline 214. The molten uniform mixture is then released from the riser 401 through the valve 213.

Figure 4:
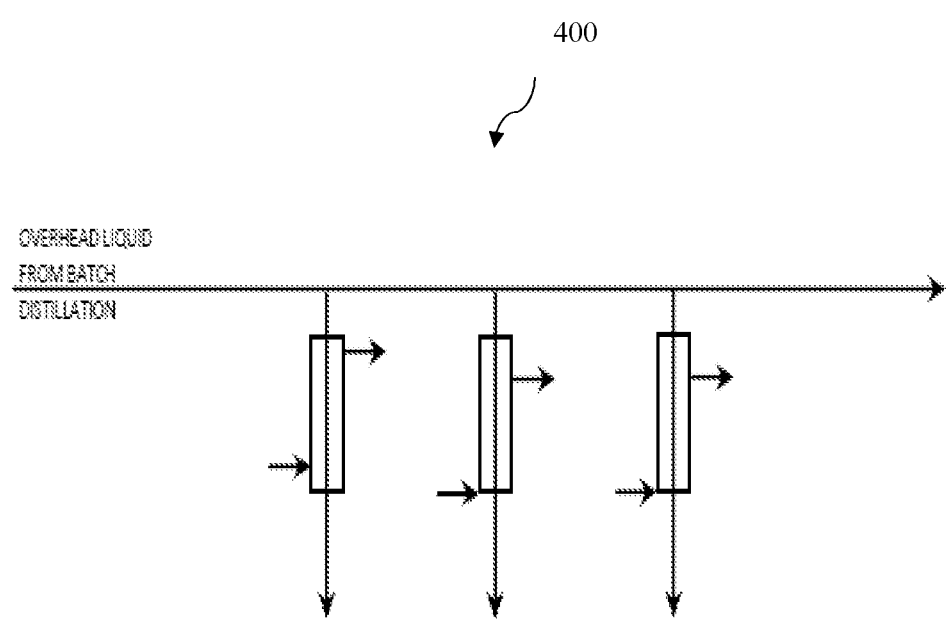
FIG. 4 is a schematic representation of a device for automated collection of batch distillation, in accordance with an embodiment of the present invention.

The FIG. 4 is a schematic representation of a device for automated collection of liquid product from batch distillation, in accordance with an embodiment of the present invention. The device uses the fact that the congeal temperature of the overhead product steadily increases as lighter materials are withdrawn as product. Indeed, a key specification for wax products is the congeal point. The concept of the device is to automatically redirect the distillate once the congeal temperature passes certain threshold values. For illustrative purposes in FIG. 4, the device is shown to comprises three heat exchangers. It will be clear to one skilled in the art that more or fewer exchangers could be employed in the same concept. The liquid from the condenser passes through a horizontal, heat traced or jacketed pipe with a number of full bore tees with the branches oriented vertically downwards. From each tee, piping runs vertically downwards into a jacketed section. The jacketed section functions as a double pipe heat exchanger and cools any liquid passing through to a temperature defined by the temperature of the coolant and the diameter of the inner pipe. The coolant circulating in the three exchangers shown is controlled at three different temperatures, with the first exchanger coolest and the third exchanger hottest of the three. Initially, the liquid flows through the first exchanger to a collection tank below as this is the "path of least resistance" for the overhead liquid. However, as the distillation progresses, the material becomes higher in congeal point until a time is reached when the material freezes in the first heat exchanger. After that flow is no longer possible through the first exchanger which blocks with frozen hydrocarbon, consequently the new "path of least resistance" is through the second heat exchanger. This exchanger uses a higher temperature coolant and consequently will initially be open and will remain open until the congeal temperature is exceeded and the second exchanger plugs in its turn with liquid directed to the next new "path of least resistance". In principle any number of such devices could be used to collect fractions by melting point. In the embodiment shown in FIG. 4, 3 such devices are used. Typically, the circulating coolant temperatures will be 20° C., 55° C. and 75° C. which enables the overhead condensate to be collected in distinct cuts: liquids (congeal point <20° C.), light wax (congeal point 20-55° C.), medium wax (congeal point 55-75° C.) and heavy wax (congeal point >75° C.). Once distillation of a batch is finished, the outlets are cleared by increasing the coolant temperatures in each device and then resetting the temperatures ready for the next batch.

The present invention discloses an efficient process for production of useful hydrocarbon materials from plastic waste. The process enables reducing energy requirement as bulk liquid is also considered as product along with vapour phase. The process provided by the present invention is energy efficient and ensures purity of the product. The process provides higher yield due to recycling of all aliphatic molecules that are not in the desired size range for the products. The process enables recycling heavy molecules to extinction and alternative to consider them as heavy waxes creates significant flexibility and potential for high value products. The process provides the possibility to incorporate externally sourced medium carbon number molecules including specialty materials such as decalin which creates significant flexibility and potential for high value products. The possibility to operate the process in batch mode allows to operate the process intermittently without heavy feed (i.e., without waste plastics) thus can be configured to convert any outside low cost medium molecular weight materials (heavy naphtha, distillate, light wax) to lightly branched molecules. Addition of low molecular weight olefins from external sources enables valuable lube base stocks to be produced from ethylene and lube range materials. Arrangement of the second zone into the thermolysis reactor 301 to produce low molecular weight olefins enables lube base stocks to be produced from medium and low molecular weight materials. Maintaining the thermolysis reactor 301 at isothermal conditions avoids the complications of coke formation. Addition of solution reactant after thermolysis and before hydrotreating facilitates finishing process. The separation of the thermolyzed material into different streams facilitates maximizing the product slate value while recycling less valuable material and providing fuel for the process. The present invention also provides a reaction system 200 for production of useful hydrocarbon materials from plastic waste. The reaction system 200 comprises the thermolysis reactor 301 comprising primary zone and optional secondary zone. The optional secondary zone enables optional further cracking of low molecular hydrocarbons to smaller olefins which contribute to obtaining the product in various ranges of hydrocarbons.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

I claim:

1. A process for production of hydrocarbon materials from at least one of plastic waste and high boiling hydrocarbons or combination thereof comprising:
   a. mixing high molecular weight hydrocarbons, and lower molecular weight hydrocarbons to obtain a uniform mixture representative of low viscosity dissolved polymer phase,
      wherein the high molecular weight hydrocarbons being selected from a group consisting shredded waste plastic, un-shredded waste plastic, high boiling hydrocarbons and combination thereof,
      wherein the uniform mixture comprises 70% wt-30% wt of the high molecular weight hydrocarbons, and 30% wt-70% wt of the lower molecular weight hydrocarbons;
   b. heating the uniform mixture to obtain a molten state;
   c. separating heavy contaminants and light contaminants from molten uniform mixture prior to thermolysis reaction;
   d. frequentatively thermolyzing the molten uniform mixture at a predefined temperature, pressure and duration to initiate free radical chemical reactions and causing breakdown of the uniform mixture,
      wherein the predefined temperature ranges from 350° C. to 425° C., the predefined pressure ranges from 3-20 bar, and predefined duration ranges from 1 to 4 hours;
   e. separating thermolyzed uniform mixture into three streams, wherein the three streams comprise dissolved hydrocarbon gases including light naphtha range material, naphtha through light wax material, and a crude thermolyzed product material; and
   f carrying out short path distillation (SPD) to separate the crude thermolyzed product material into fractions,
      wherein the SPD being carried out at temperature 360° C.

2. The process of claim 1, wherein the lower molecular weight hydrocarbons are selected from a group consisting of naphtha/distillate range material, n-paraffin, decalin, coker gas oils and diesel.

3. The process of claim 1, wherein the uniform mixture comprises 40% wt of the high molecular weight hydrocarbons, and 60% wt of the low molecular weight hydrocarbons.

4. The process of claim 1, wherein the uniform mixture is heated at temperature ranging from 180° C. to 250° C.

5. The process of claim 1, wherein the frequentatively thermolyzing of the molten uniform mixture is carried out at 15 bar pressure.

6. The process of claim 1, wherein the crude thermolyzed product material from the three streams comprise heavy waxes with molecular weight ranging from 1,500 to 6,000 Dalton.

7. The process of claim 1, wherein the steps (a) to (e) are operated intermittently in a batch mode.

8. The process of claim 7, wherein the batch mode is configured to convert medium molecular weight hydrocarbons produced during breakdown of the high molecular weight hydrocarbons to low molecular weight hydrocarbons.

9. The process of claim 1, wherein the steps (a) to (e) are operated in a continuous mode.

10. The process of claim 1, further comprises recycling each of the three streams by supplying back to at least one step of the mixing of high molecular weight hydrocarbons and lower molecular weight hydrocarbons, the heating of the uniform mixture, and the frequentatively thermolyzing molten uniform mixture, independently.

11. The process of claim 10, wherein the recycling of each of the three streams by supplying back comprises supplying the light naphtha range material as fuel for one of the heating the uniform mixture and the thermolyzing the molten uniform mixture.

12. The process of claim 10, wherein the recycling of each of the three streams by supplying back comprises supplying back the stream of naphtha through light wax as solution reactant to the mixing step.

13. The process of claim 1, further comprises adding one or more low molecular weight olefins selected from a group comprising, 1-octene and 1-hexene to the step (a) to undergo supplementary reactions in free radical environment.

14. The process of claim 1, further comprises adding a solution reactants after the thermolysis and before hydrotreating process to reduce viscosity of the crude thermolyzed product material to accelerate a hydrogenation process, wherein the adding of the solution reactants after the thermolysis enables separation of waxy molecules from non-waxy molecules by differential solidification, wherein the solution reactants comprise similar hydrocarbons as the lower molecular weight hydrocarbons.

15. The process of claim 1, further comprises one of hydrogenating and oxidizing one of the high molecular weight hydrocarbons from the step (a) and the fractions obtained from step (f).

* * * * *